(12) United States Patent
Cofta

(10) Patent No.: US 8,190,127 B2
(45) Date of Patent: May 29, 2012

(54) METHODS, APPARATUSES AND SOFTWARE FOR AUTHENTICATION OF DEVICES TEMPORARILY PROVIDED WITH A SIM TO STORE A CHALLENGE-RESPONSE

(75) Inventor: Piotr L Cofta, Ipswich (GB)

(73) Assignee: British Telecommunications plc, London (GB)

( * ) Notice: Subject to any disclaimer, the term of this patent is extended or adjusted under 35 U.S.C. 154(b) by 746 days.

(21) Appl. No.: 12/281,683

(22) PCT Filed: Mar. 7, 2007

(86) PCT No.: PCT/GB2007/000783
§ 371 (c)(1),
(2), (4) Date: Sep. 4, 2008

(87) PCT Pub. No.: WO2007/104923
PCT Pub. Date: Sep. 20, 2007

(65) Prior Publication Data
US 2009/0011739 A1 Jan. 8, 2009

(30) Foreign Application Priority Data
Mar. 16, 2006 (EP) .................................. 06251420

(51) Int. Cl.
*H04M 1/66* (2006.01)
*H04M 1/68* (2006.01)
*H04M 3/16* (2006.01)
(52) U.S. Cl. ...................... 455/411; 455/410; 455/414.1; 379/142.05; 726/1; 726/22; 726/26; 726/34
(58) Field of Classification Search ............... 455/414.1, 455/410–411; 379/142.05; 726/1–36
See application file for complete search history.

(56) References Cited

U.S. PATENT DOCUMENTS

| 6,549,912 B1 * | 4/2003 | Chen ................................... 1/1 |
| 7,370,350 B1 * | 5/2008 | Salowey .......................... 726/7 |
| 2003/0204743 A1 | 10/2003 | Devadas et al. |
| 2005/0228992 A1 * | 10/2005 | Mizikovsky .................. 713/168 |

FOREIGN PATENT DOCUMENTS

| GB | 2408181 | 5/2005 |
| WO | 2005/048179 A1 | 5/2005 |

OTHER PUBLICATIONS

ETSI TS 133 102 V7.0.0 (Dec. 2005).*
"Universal Mobile Telecommunications Systems (UMTS)", 3G security, Security architecture, ETSI Standards, European Telecommunications Standards Institute, vol. 3-SA3, No. V700, Dec. 2005, pp. 1-64, XP014032863.

* cited by examiner

Primary Examiner — Nick Corsaro
Assistant Examiner — Quan Hua
(74) Attorney, Agent, or Firm — Nixon & Vanderhye PC

(57) ABSTRACT

A process is provided in which a first device, e.g., a hub device of a home network, is temporarily provided with a SIM to store a challenge-response, and thereafter the first device uses the stored challenge-response to interrogate a second device, e.g., a mobile telephone, to authenticate that the second device now has the SIM with which the first device was previously provided. A further process is provided in which the second device authenticates that the first device previously had access to the SIM by verifying that a response from one or more challenge-response pairs provided by the first device to the second device is the same as a response received by the second device from the SIM when the second device interrogates the SIM with the challenge of the challenge-response pair received earlier from the first device.

19 Claims, 5 Drawing Sheets

METHODS, APPARATUSES AND SOFTWARE FOR AUTHENTICATION OF DEVICES TEMPORARILY PROVIDED WITH A SIM TO STORE A CHALLENGE-RESPONSE

This application is the U.S. national phase of International Application No. PCT/GB2007/1000783 filed 7 Mar. 2007 which designated the U.S. and claims priority to European Patent Application No. 06251420.3 filed 16 Mar. 2006, the entire contents of each of which are hereby incorporated by reference.

TECHNICAL FIELD

The present invention relates to authentication of communication devices. The present invention relates in particular, but not exclusively, to authentication of communication devices in local networks, for example home networks.

BACKGROUND TO THE INVENTION AND PRIOR ART

Communication networks are becoming increasingly prevalent, including relatively small or local networks such as home networks.

A home network typically includes a hub and one or more so-called local devices. The hub may be a WiFi-enabled telephone with the local devices being 3G/WiFi telephones. Another example is where the hub device is a Bluetooth-enabled broadband interface device and the local devices are Bluetooth-enabled mobile telephones, that when located in range of the Bluetooth link with the hub device may perform telephone calls via the hub device's broadband interface.

In small scale or localised networks, authentication processes typically require manual user input of identification data, for example computer and/or router identities are entered by a user into one or more computers of a local area network or home wireless network.

Quite separate from home networks, it is known in the field of cellular communications systems to carry out centralized authentication processes in which a network operator uses a challenge-response pair to authenticate a Subscriber Identity Module (SIM) when the SIM is present in a communication device, for example a mobile telephone. The process relies upon the network operator knowing a key that is unique to a given SIM and which is programmed in the SIM. An extension of this process is provided by a protocol called Generic Authentication Architecture (GAA), which is standardised by 3GPP in TR33.919 and related standards. GAA allows authentication of SIMs to be exported to service providers other than the network operator. In overview, challenge-response pairs are provided by the network operator to the service provider, for the service provider to use, e.g. at a later time, to authenticate the SIM. Thus, although the ultimate authentication step is not carried out by the network operator as such, nevertheless the network operator is involved at earlier stages of the process. It will be appreciated that these processes are ones in which the SIM itself is being authenticated by the network operator (or service provider with permission and involvement of the network operator) using a challenge-response functionality, including a key, that has been provided in the SIM by the network operator for this specific purpose.

In another separate field, GB2,408,181 describes a wireless configuration process in which a SIM is in effect used as a memory device for a first communication device to write configuration data on to. The SIM is then inserted in a second communication device which can then read the configuration data.

In the field of authentication, US2003/204743 describes methods and apparatus for the authentication of integrated circuits. A group of devices such as integrated circuits are fabricated based on a common design, each device having a corresponding set of measurable characteristics that is unique in the group to that device, each device having a measurement module for measuring the measurable characteristics. Authentication of one of the group of devices by an authenticating unit is enabled by selective measurement of one or more of the characteristics of the device. It will be noted that is necessary for the authenticating unit itself to be provided with the responses (i.e. the correct measurements) that should be received from the or each device on measuring its response to challenges.

In the field of smart cards, U.S. Pat. No. 6,549,912 describes a loyalty file structure for a smart card which includes any number of loyalty files pre-installed by a card manufacturer. The loyalty file on a card may be used with electronic ticketing to store information pertaining to a purchased ticket, such as an airline ticket. Upon later presentation of the card at an airline boarding gate, stored information in the loyalty file is compared with the same information downloaded from the airline host computer. A match indicates a valid purchase and a boarding pass may be issued. Again it will be noted that is necessary for a unit at the boarding gate to be provided not only with appropriate challenges, but also with the responses that should be received in response to challenges.

Finally, WO 2005/048179 relates to an information carrier containing a non-clonable optical identifier having an optical scattering medium for being challenged by and for scattering a light beam. In order to provide a secure information carrier, it further has a light absorbing means for reducing the intensity of the light beam so that an integration time for obtaining a response signal by integrating the scattered light beam is extended.

SUMMARY OF THE INVENTION

In a first aspect the present invention provides a method for a first communications device to authenticate a second communications device; the method comprising: providing a first communications device with functional access to a challenge-response means, wherein the challenge-response means provides responses to challenges dependent upon a key held by the challenge-response means; the first communications device providing a challenge to the challenge-response means and receiving a corresponding response from the challenge-response means thereby providing a challenge-response pair; the first communications device storing the challenge-response pair; removing the functional access to the challenge-response means from the first communications device; providing a second communications device with functional access to the challenge-response means; the first communications device sending the challenge of the stored challenge-response pair to the second communications device; the second communications device sending the challenge of the stored challenge-response pair to the challenge-response means and receiving a corresponding response from the challenge-response means; the second communications device sending the received response to the first communications device; and the first communications device verifying that the response received from the second communications device is the same as the stored response.

It will be understood that the challenges and their respective responses will in general be numbers, or will at least symbolise numbers, thereby enabling embodiments of the invention to take advantage of the challenge-response functionality of challenge-response means such as existing SIMs, but it will also be understood that embodiments of the invention are foreseeable in which the challenges and/or responses are not numbers.

The method may further be for the second communications device to authenticate the first communications device; the method further comprising steps whereby: the first communications device provides at least one further challenge to the challenge-response means and receives a corresponding at least one further response from the challenge-response means thereby providing in total at least two challenge-response pairs; the first communications device stores the at least one further challenge-response pair thereby providing in total at least two stored challenge-response pairs; and the method further comprises the steps of: the first communications device sending one of the at least two stored challenge-response pairs to the second communications device; the second communications device receiving the challenge-response pair and storing the received challenge-response pair; the second communications device sending the challenge of the received challenge-response pair to the challenge-response means and receiving a corresponding further response from the challenge-response means; and the second communications device verifying that the further response received from the challenge-response means is the same as the stored response of the stored challenge-response pair.

In a further aspect the present invention provides a method for a second communications device to authenticate a first communications device; the method comprising: providing a first communications device with functional access to a challenge-response means, wherein the challenge-response means provides responses to challenges dependent upon a key held by the challenge-response means; the first communications device providing a challenge to the challenge-response means and receiving a corresponding response from the challenge-response means thereby providing a challenge-response pair; the first communications device storing the challenge-response pair; removing the functional access to the challenge-response means from the first communications device; providing a second communications device with functional access to the challenge-response means; the first communications device sending the stored challenge-response pair to the second communications device; the second communications device receiving the challenge-response pair and storing the received challenge-response pair; the second communications device sending the stored challenge to the challenge-response means and receiving a corresponding response from the challenge-response means; and the second communications device verifying that the response received from the challenge-response means is the same as the stored response.

In any of the above aspects, the first communications device may be a hub device and the second communications device may be a local device of a local network.

In any of the above aspects comprising a method, the challenge-response means may be a Subscriber Identity Module of a cellular communications network.

In any of the above aspects, providing the second communications device with functional access to the challenge-response means may comprise physically locating the challenge-response means in or in contact with the second communications device.

In any of the above aspects, providing the first communications device with functional access to the challenge-response means may comprise physically locating the challenge-response means in or in contact with the first communications device.

In any of the above aspects, providing the first communications device with functional access to the challenge-response means may comprise the first communications device coupling to the challenge-response means whilst the challenge-response means is physically located in or in contact with the second communications device.

In a further aspect, the present invention provides a first communications device adapted to authenticate a second communications device; the first communications device adapted to provide a challenge to a challenge-response means when the first communications device has functional access to the challenge-response means, the challenge-response means providing responses to challenges dependent upon a key held by the challenge-response means; the first communications device further adapted to store the challenge and store a response corresponding to the challenge received from the challenge-response means; the first communications device further adapted to send the stored challenge to the second communications device; the first communications device further adapted to receive a response from the second communications device; and the first communications device further adapted to verify that the response received from the second communications device is the same as the stored response.

The first communications device may be further adapted to be authenticated by the second communications device; with the first communications device further adapted to provide a further challenge to the challenge-response means when the first communications device has functional access to the challenge-response means; the first communications device further adapted to store the further challenge and store a further response, corresponding to the further challenge, received from the challenge-response means; and the first communications device further adapted to send the stored further challenge and the stored further response to the second communications device.

In a further aspect, the present invention provides a first communications device adapted to be authenticated by a second communications device; the first communications device adapted to provide a challenge to a challenge-response means when the first communications device has functional access to the challenge-response means, the challenge-response means providing responses to challenges dependent upon a key held by the challenge-response means; the first communications device further adapted to store the challenge and store a response corresponding to the challenge received from the challenge-response means; and the first communications device further adapted to send the stored challenge and the stored response to a second communications device.

In a further aspect, the present invention provides a second communications device adapted to authenticate a first communications device; the second communications device adapted to receive and store a challenge-response pair from the first communications device; the second communications device adapted to send the challenge of the received and stored challenge-response pair to a challenge-response means when the second communications device has functional access to the challenge-response means, the challenge-response means providing responses to challenges dependent upon a key held by the challenge-response means; the second communications device adapted to receive a response from the challenge-response means; and the second communications device adapted to verify that, the response received from the challenge-response means is the same as the stored response.

The communications device may comprise means for physically locating the challenge-response means in or in contact with the communications device for providing functional access to the challenge-response means.

The communications device may comprise means for achieving functional access to the challenge-response means comprising means for coupling to the challenge-response means whilst the challenge-response means is physically located in or in contact with a different communications device.

In any of the above aspects comprising a communications device, the challenge-response means may be a Subscriber Identity Module of a cellular communications network.

In a further aspect a process is provided in which a first device, e.g. a hub device of a home network, is temporarily provided with a SIM to store a challenge-response, and thereafter the first device uses the stored challenge-response to interrogate a second device e.g. a mobile telephone, to authenticate that the second device now has the SIM that the first device was previously provided with. In a further aspect, a further process is provided in which the second device authenticates that the first device previously had access to the SIM by verifying that a response from one or more challenge-response pairs provided by the first device to the second device is the same as a response received by the second device from the SIM when the second device interrogates the SIM with the challenge of the challenge-response pair received earlier from the first device.

Thus aspects of the present invention provide a process in which challenge-response functionality of a SIM may be used for a completely new purpose of authenticating one or more communication devices, for example for use in a network unrelated to the cellular communication network for which the SIM is originally provided and for whose authentication process the challenge-response functionality was provided.

BRIEF DESCRIPTION OF THE DRAWINGS

Embodiments of the invention will now be described, by way of example only, with reference to the accompanying drawings, in which.

DESCRIPTION OF THE EMBODIMENTS

Figure 1:
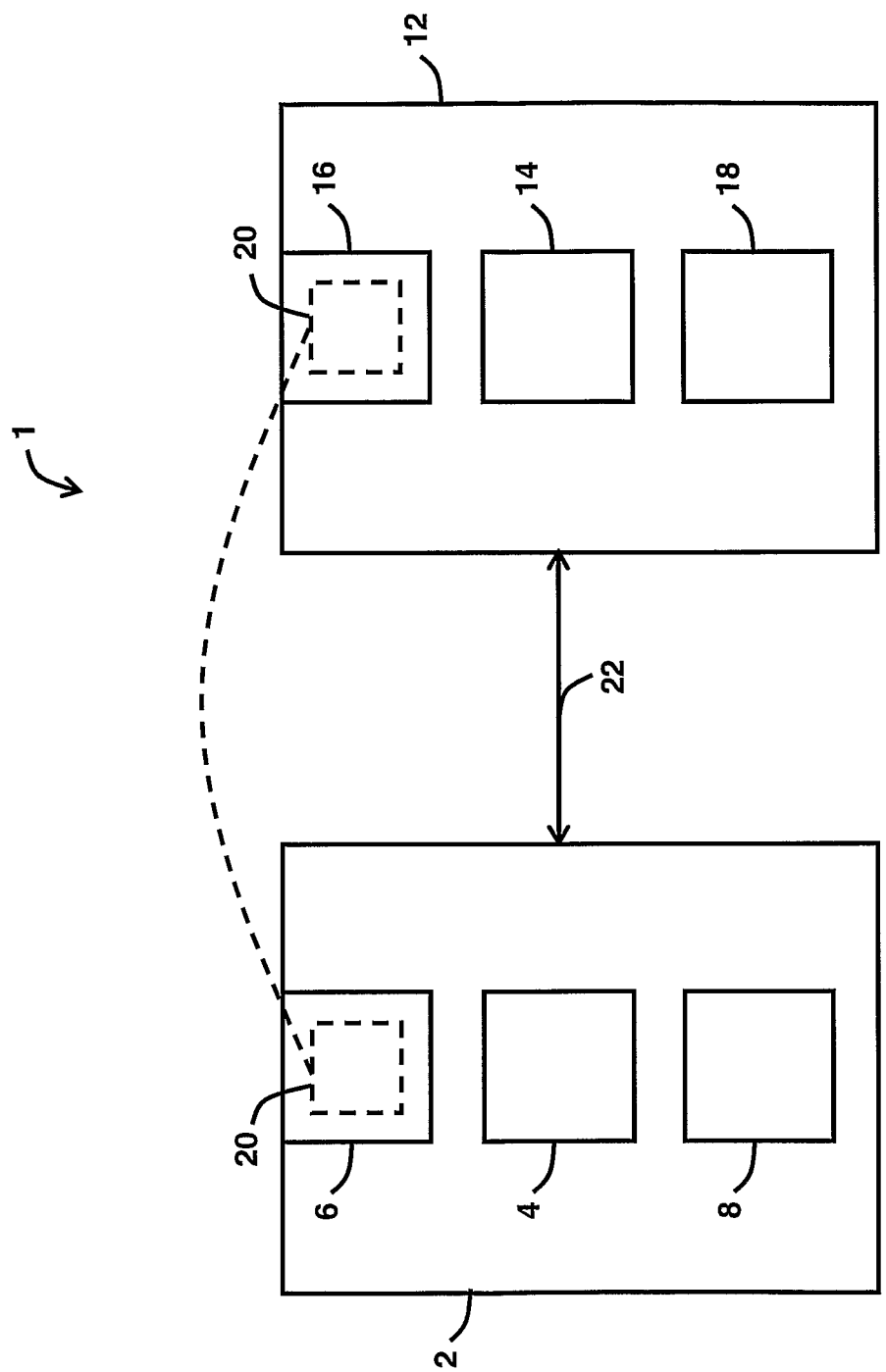
FIG. 1 is a block diagram of part of a home network in which an embodiment of the present invention is implemented.

FIG. 1 is a block diagram of part of a communication network 1 in which an embodiment of the present invention is implemented. In this embodiment the communication network 1 is a local network, more particularly a home network comprising a hub device 2 and a plurality of local devices, of which one, a mobile telephone 12, is shown in FIG. 1.

The hub device 2 comprises a processor 4, a SIM reader 6 coupled to the processor 4, and a storage medium 8 coupled to the processor 4. The hub device 2, under control of the processor 4, and where appropriate using instructions and/or data stored in the storage medium 8, serves to act as a hub device with respect to the local devices such as mobile telephone 12. In this embodiment, the hub device 2 provides an interface to the home user's broadband Internet connection (not shown), and forwards communications from and to the mobile telephone 12 over that connection when the mobile telephone is in Bluetooth range of the hub device 2, i.e. in practise when the user is at home.

Communication between the hub device 2 and the mobile telephone 12 takes place over a Bluetooth link 22, and the operation of that link at hub device 2 is also controlled by processor 4.

The SIM reader 6, under control of the processor 4, can be used, in conventional fashion, for example to share and transfer the phone book between the hub device and the mobile telephone. However, for much of the time hub device is operating it does not have a SIM positioned in the SIM reader 6. A new use of the SIM reader 6 in a process of authenticating the mobile telephone 12 will be described later below. During this process, a SIM 20 usually positioned in the mobile telephone 12 will instead be positioned temporarily in the SIM reader 6 of hub device 2, as indicated in FIG. 1 by SIM 20 positioned being shown in dotted lines positioned in the SIM reader 6.

The mobile telephone 12 comprises a processor 14, a SIM reader 16 coupled to the processor 14, and a storage medium 18 coupled to the processor 14. The mobile telephone 12, under control of the processor 14, and where appropriate using instructions and/or data stored in the storage medium 18, serves to act as a local device with respect to the hub device 2. In this embodiment, the mobile telephone 12 transmits and receives telephone calls and other communications over the Bluetooth link 22 to and from the hub device 2 for further transmission over the user's broadband Internet link when in Bluetooth range of the hub device 12, i.e. in practise when the user is at home.

When the mobile telephone 12 is not in Bluetooth range of the hub device 2, i.e. in practise when the user is not at home, the processor 14 controls the mobile telephone 12 to operate as a conventional mobile telephone making calls and other communications via the cellular structure of the user's cellular communications network operator. Such operation is implemented in conventional fashion, including conventional use of a SIM 20 according to the Global System for Mobile Communications (GSM) specification. The SIM 20 is positioned in, and read by, the SIM reader 16. The SIM reader 16 is under control of the processor 14. The SIM 20 is shown in dotted outline located in the SIM reader 16 as in this embodiment the SIM 20 will also be temporarily positioned instead in the SIM reader 6 of the hub device 2, as will be described in more detail later below.

It will be appreciated that the hub device 2 and mobile telephone 12 comprise many other conventional components and functions used in conventional home network and mobile telephone operation, however further explanation of these is not necessary for understanding the present invention.

Operation of the network 1 according to an embodiment of a process of authentication will be described below with reference to FIG. 2. In the process, use is made of the challenge-response procedure conventionally used in a cellular communications system, as specified in the GSM specification, to authenticate a SIM. Implementation details of the challenge-response procedure are well known to the skilled person. Under the challenge-response procedure, the network operator and the SIM each have knowledge of a shared key unique to that SIM (as opposed to other SIMs).

The network operator sends a challenge, comprising a random or otherwise generated number of a given format, to the SIM. The SIM uses an algorithm based on the random number and the shared key to calculate a response number. The response number is transmitted back to the network operator. The network operator compares the response number received from the SIM with the value expected from performing its own calculation based on the random number and the shared key, to verify a correct response from the SIM.

Additionally, an encryption key is generated on both sides of the authentication, i.e. at the network operator and at the SIM within the communications device. Thus an encryption key becomes stored at both parties and this can be used to encrypt communication.

Where this challenge-response procedure is made use of in the following embodiment (and other GSM embodiments described), details, e.g. of number formats, key formats, algorithms, encryption key and process, etc. are as specified in the GSM specification, except where stated otherwise.

Figure 2:
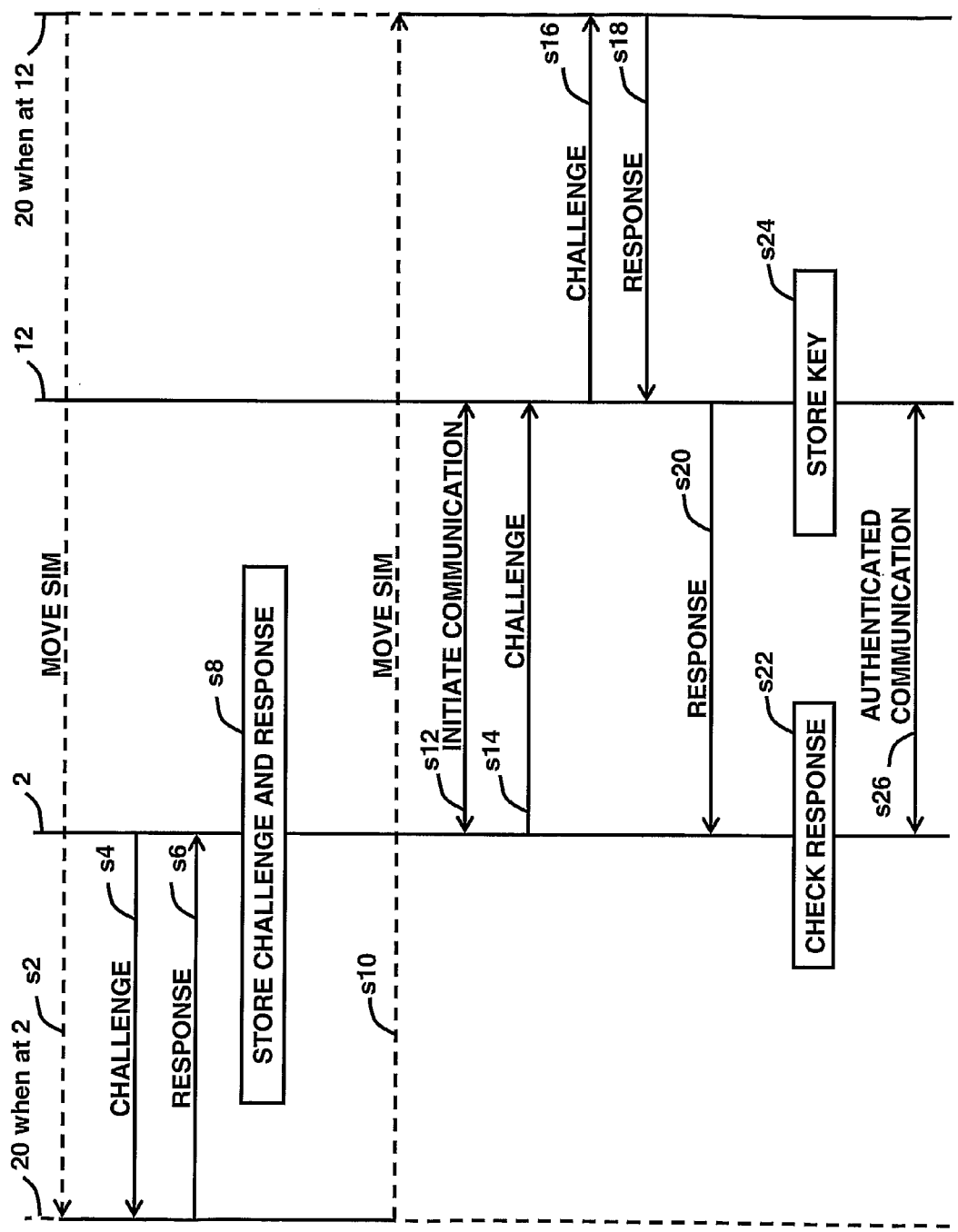
FIG. 2 is a hybrid message flow diagram/process flowchart showing certain messages and steps involved in an embodiment of an authentication process.

FIG. 2 is a hybrid messages flow diagram/process flowchart showing certain messages and steps involved in the authentication process of this embodiment. The following entities are shown: the hub device 2, the mobile telephone 12, and the SIM 20. The respective vertical lines indicating each of the two respective physical/coupled positions of the SIM 20, namely "when at (the hub device) 2" and "when at (the mobile telephone) 12" are shown as a filled-in line when the SIM 20 is at that position and shown as a dotted line when the SIM is not at that position.

In this example it is assumed that at the start of the overall process, the SIM 20 is in the mobile telephone 12. The process of FIG. 2 comprises firstly the hub device being set up to be able to authenticate the mobile telephone 12, and then secondly the mobile device being later authenticated.

At step s2, the SIM 20 is physically moved from the SIM reader 16 of the mobile telephone 12 to the SIM reader 6 of the hub device 2.

At step s4, the processor 4 of hub device 2 sends a challenge, i.e. a suitably formatted challenge number, to the SIM 20 via the SIM reader 6.

At step s6, the SIM 20 sends a response back to the hub device 2, the response comprising the calculated response number for the received challenge number, and, in this example, also a copy of the encryption key.

At step s8, hub device 2, under control of the processor 4, stores the challenge number, the received response number and the encryption key in the storage medium 8, i.e. a challenge-response pair (and in this example the encryption key) is stored.

Steps s4 to s8 can be repeated to allow plural challenge-response pairs and encryption keys to be stored.

The hub device 2 is now set up to be able to authenticate the mobile telephone 12, so at step s10 the SIM 20 is physically moved from the SIM reader 6 of the hub device 2 back to the SIM reader 16 of the mobile telephone 12.

Authentication of the mobile telephone 12 at the hub device 2 may now be carried out when communication between the mobile telephone 12, containing the SIM 20, and the hub device 2, is initiated. In this example initiation of communication takes place at step s12, in which the mobile telephone 12 initiates and conducts a handshake procedure with the hub device 2. The step s12 of initiating communication may take various forms, and will depend upon the overall system arrangement between the hub device 2 and the mobile telephone 12. Although indicated for clarity as a single discrete step in FIG. 2, step s12 may therefore typically comprise a number of communications sent back and forth between the mobile telephone 12 and the hub device 2. Also, for example, step s12 may in fact effectively be initiated by the hub device 12, for example by polling to determine which local devices, in this case the mobile telephone 12, are in range and/or wish to carry out communication.

Following such initiation of communication, at step s14, the hub device sends a challenge comprising the stored challenge number (or if plural challenge numbers are stored, one of the plurality) to the mobile telephone 12.

At step s16, the processor 14 of the mobile telephone 12 forwards the challenge to the SIM 20 via the SIM reader 16.

At step s18, SIM 20 sends a response back to the hub device 2, the response comprising the calculated response number for the received challenge number. The encryption key can be also read from SIM 20 but it is retained by the mobile telephone 12.

At step s20, the mobile telephone 12 forwards the response to the hub device 2.

At step s22, the processor 4 of the hub device 2 checks the received response by comparing the received response number with the response number stored earlier at step s8. If the number matches, then hub device 2 has authenticated the presence in the mobile telephone 12 of the correct SIM 20, i.e. the SIM is the same one as had been processed earlier by the hub device 2.

At step s24, the mobile telephone 12 stores the encryption key in the storage medium 18 under the control of the processor 14. Step s24 may be carried out before, simultaneously or otherwise temporally overlapping with, or after, step s22.

Hence, authentication is complete and at step s26, the hub device 2 allows authenticated communication to take place between the hub device 2 and the mobile telephone 12.

Since, in this example, the encryption key has been shared between the hub device 2 and the mobile telephone 12, the authenticated communication may also be in the form of encrypted communication with the two devices making use of the encryption key. However, it will be appreciated that in such encryption of the communication, and indeed the inclusion of the encryption key with the response messages in steps s6 and s18 above, and storage of the encryption key as part of step s8 and at step s24, may be omitted, in which case authentication is carried out but not encryption.

After the authenticated communication of step s26 has been terminated, when at a future time further authentication communication is required, steps s12 to s26 are repeated. In those situations where multiple challenge-responses have been stored during the set-up phase by repetition of steps s2-s8, a different challenge-response-pair may be used for each repetition of steps s12 to s26, i.e. for each authentication phase of the overall process.

Thus in this embodiment a process is provided in which during a set-up phase a first device (the hub device 2) is temporarily provided with the SIM 20 to store one or more challenge-responses, and thereafter during one or more authentication phases the first device with the stored one or more challenge-response uses a stored challenge-response to interrogate a second device (the mobile telephone 12) to authenticate that the second device now has the SIM 20 that the first device was previously provided with.

In a second embodiment, explained in more detail below with reference to FIG. 3 and using the same network components as described above, the same set-up phase is again used, that is the first device (the hub device 2) is temporarily provided with the SIM 20 to store one or more challenge responses. However, in the second embodiment, the authentication phase is different to that of the first embodiment, since in the second embodiment a second device (the mobile telephone 12), i.e. a further device in which the SIM is then inserted (for example returned to as in the above example, although this need not be the case), authenticates the first device by demonstrating that the first device has been in a possession of the SIM that is currently inserted in the second device. Hence, in the second embodiment authentication is carried out in the opposite direction or sense compared to that in which authentication is carried out in the first embodiment.

It will be noted that in the above process, both devices acquire not only authentication but also generate keys that can be used to encrypt the communication between them.

Figure 3:
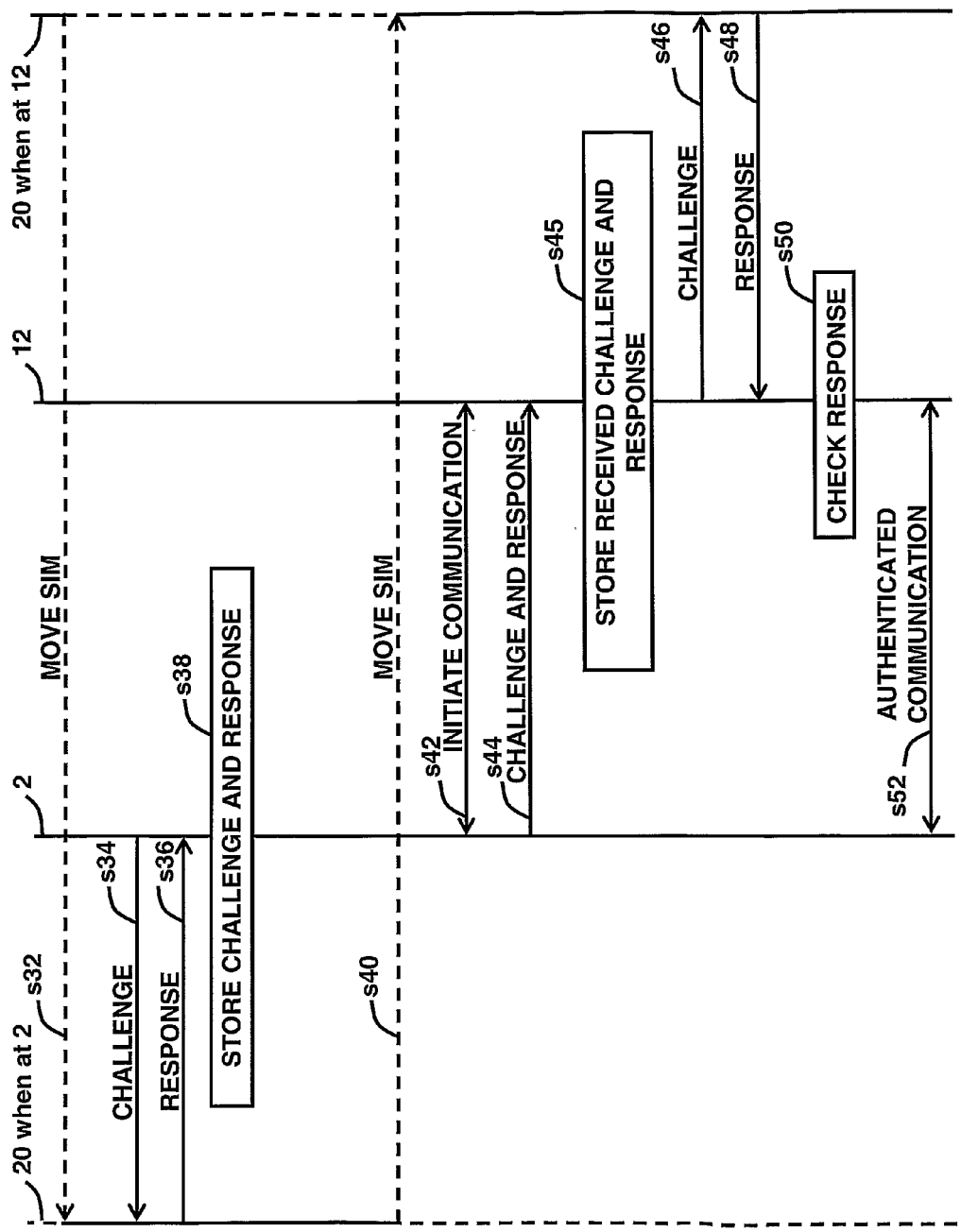
FIG. 3 is a hybrid message flow diagram/process flowchart showing certain messages and steps involved in another embodiment of an authentication process.

FIG. 3 is a hybrid message flow diagram/process flowchart showing certain messages and steps involved in the authentication process of this second embodiment. The same entities as were used in the first embodiment are shown, namely: the hub device 2, the mobile telephone 12, and the SIM 20. Again, the respective vertical lines indicating each of the two respective physical/coupled positions of the SIM 20, namely "when at (the hub device) 2" and "when at (the mobile telephone) 12" are shown as a filled-in line when the SIM 20 is at that position and shown as a dotted line when the SIM is not at that position.

In this example it is again assumed that at the start of the overall process, the SIM 20 is in the mobile telephone 12. The process of FIG. 3 comprises firstly the hub device being set up to be able to be authenticated by the mobile telephone 12, and then secondly the mobile device 12 later authenticating the hub device 2.

At step s32, the SIM 20 is physically moved from the SIM reader 16 of the mobile telephone 12 to the SIM reader 6 of the hub device 2.

At step s34, the processor 4 of hub device 2 sends a challenge, i.e. a suitably formatted challenge number, to the SIM 20 via the SIM reader 6.

At step s36, the SIM 20 sends a response back to the hub device 2, the response comprising the calculated response number for the received challenge number, and, in this example, a copy of the encryption key. However, in this example, no further use is made of this encryption key.

At step s38, the hub device 2, under control of the processor 4, stores the challenge number and the received response number in the storage medium 8, i.e. a challenge-response pair is stored.

Steps s34 to s38 can be repeated to allow plural challenge-response to be stored.

The hub device 2 is now set up to be authenticated by the mobile telephone 12, so at step s40 the SIM 20 is physically moved from the SIM reader 6 of the hub device 2 back to the SIM reader 16 of the mobile telephone 12.

Authentication of the hub device 2 by the mobile telephone 12 may now be carried out when communication between the mobile telephone 12, containing the SIM 20, and the hub device 2, is initiated. In this example initiation of communication takes place at step s42, in which the mobile telephone 12 initiates and conducts a handshake procedure with the hub device 2. The step s42 of initiating communication may take various forms, and will depend upon the overall system arrangement between the hub device 2 and the mobile telephone 12. Although indicated for clarity as a single discrete step in FIG. 3, step s42 may therefore typically comprise a number of communications sent back and forth between the mobile telephone 12 and the hub device 2. Also, for example, step s42 may in fact effectively be initiated by the hub device 12, for example by polling to determine which local devices, in this case the mobile telephone 12, are in range and/or wish to carry out communication.

Following such initiation of communication, at step s44, the hub device sends a challenge-response pair comprising the stored challenge number and corresponding stored response number (or if plural challenge-response pairs are stored, one pair of the plurality of pairs) to the mobile telephone 12.

At step s45, the mobile telephone 12, under control of the processor 14, stores the received challenge number and the received response number, i.e. the received challenge-response pair, in the storage medium 18.

At step s46, the processor 14 of the mobile telephone 12 forwards the challenge part of the received and stored challenge-response pair to the SIM 20 via the SIM reader 16.

At step s48, the SIM 20 sends a response back to the hub device 2, the response comprising the calculated response number for the received challenge number.

At step s50, the processor 14 of the mobile telephone 12 checks the response received from the SIM 20 by comparing the response number received from the SIM 20 with the response number previously stored earlier at step s45. If the number matches, then the mobile telephone 12 has authenticated that the hub device with which it is communicating previously had access to the correct SIM 20, i.e. the SIM now in the mobile telephone had previously been processed by the hub device 2.

Hence, authentication is complete and at step s52, the mobile telephone 12 allows authenticated communication to take place between the mobile telephone 12 and the hub device 2.

In this example, the encryption key has not been made use of to provide encryption i.e. communication taking place at step s52 is authenticated but not encrypted. In other examples, the communication may be encrypted by using the encryption key as in the manner of the first embodiment. In yet further examples, encryption may be provided to the authenticated communication by means of an entirely separate encryption process already provided between the hub device and the mobile telephone.

After the authenticated communication of step s52 has been terminated, when at a future time further authentication communication is required, steps s42 to s52 are repeated. In those situations where multiple challenge-responses have been stored during the set-up phase by repetition of steps s32-s38, a different challenge-response pair may be used for each repetition of steps s42 to s52, i.e. for each authentication phase of the overall process.

Thus in this second embodiment, a process is provided in which during a set-up phase a first device (the hub device 2) is temporarily provided with the SIM 20 to store one or more challenge-responses, thereafter the SIM 20 is placed in a second device (in this example is returned to the second device), and thereafter during one or more authentication phases the second device authenticates that the first device previously had access to the SIM 20 by verifying that a response from one or more challenge-response pairs provided by the first device to the second device is the same as a response received by the second device from the SIM 20 when the second device interrogates the SIM 20 with the corresponding challenge of the one or more challenge-response pairs received earlier by the second device from the first device.

In a third embodiment, explained in more detail below with reference to FIG. 4 and using the same network components as described above, the same set-up phase is again used, that is the first device (the hub device 2) is temporarily provided with the SIM 20 to store one or more challenge responses. Thereafter, in the third embodiment, in the authentication phase the first device authenticates the second device (the mobile telephone 12), i.e. a further device in which the SIM is then inserted (in this case returned to), and also the second device authenticates the first device. Hence, in the third embodiment authentication is carried out in both the direction or sense of the first embodiment and of the second embodiment, i.e. reciprocal authentication between the hub device 2 and the mobile telephone 12 is carried out.

Figure 4:
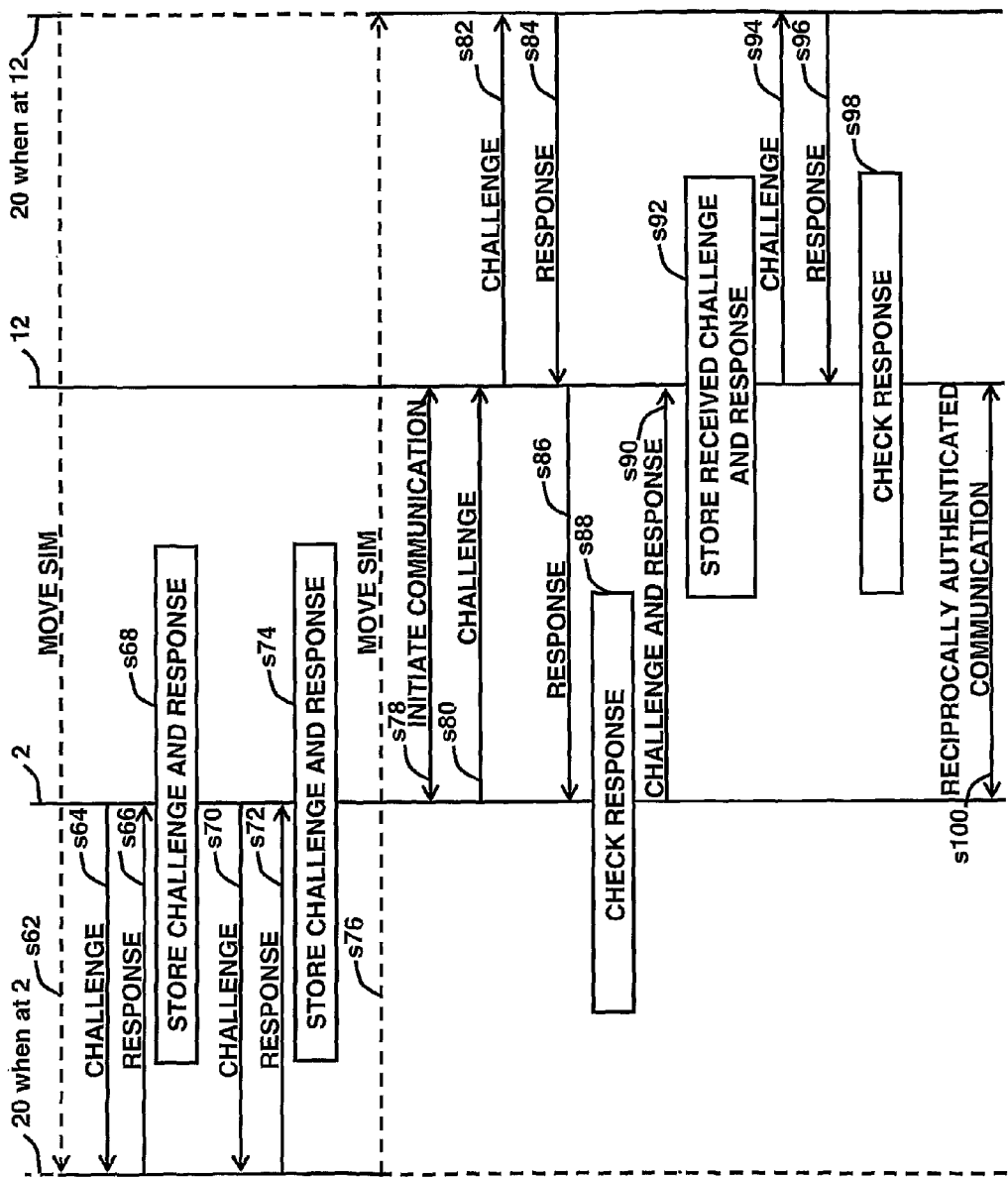
FIG. 4 is a hybrid message flow diagram/process flowchart showing certain messages and steps involved in yet another embodiment of an authentication process.

FIG. 4 is a hybrid message flow diagram/process flowchart showing certain messages and steps involved in the authentication process of this third embodiment. The same entities as were used in the first embodiment are shown, namely: the hub device 2, the mobile telephone 12, and the SIM 20. Again, the respective vertical lines indicating each of the two respective physical/coupled positions of the SIM 20, namely "when at (the hub device) 2" and "when at (the mobile telephone) 12" are shown as a filled-in line when the SIM 20 is at that position and shown as a dotted line when the SIM is not at that position.

In this example it is again assumed that at the start of the overall process, the SIM 20 is in the mobile telephone 12. The process of FIG. 4 comprises firstly the hub device being set up to be able to both authenticate the mobile telephone 12 and to be able to be authenticated by the mobile telephone 12, then secondly the hub device 2 authenticating the mobile device 12, then thirdly the mobile device 12 authenticating the hub device 2.

At step s62, the SIM 20 is physically moved from the SIM reader 16 of the mobile telephone 12 to the SIM reader 6 of the hub device 2.

At step s64, the processor 4 of hub device 2 sends a first challenge, i.e. a suitably formatted challenge number, to the SIM 20 via the SIM reader 6.

At step s66, the SIM 20 sends a first response back to the hub device 2, the first response comprising the calculated response number for the received first challenge number, and, in this example, a copy of the encryption key. However, in this example, no further use is made of this encryption key.

At step s68, the hub device 2, under control of the processor 4, stores the first challenge number and the received first response number in the storage medium 8, i.e. a first challenge-response pair is stored.

In this embodiment at least two challenge-response pairs are required, hence steps s64 to s68 are repeated by virtue of additional steps s70 to s74 as follows.

At step s70, the processor 4 of hub device 2 sends a second challenge, i.e. a suitably formatted challenge number, to the SIM 20 via the SIM reader 6.

At step s72, the SIM 20 sends a second response back to the hub device 2, the second response comprising the calculated response number for the received second challenge number, and, in this example, a copy of the encryption key. However, in this example, no further use is made of this encryption key.

At step s74, the hub device 2, under control of the processor 4, stores the second challenge number and the received second response number in the storage medium 8, i.e. a second challenge-response pair is stored.

Steps s70 to s74 can be repeated to allow further challenge-response to be stored.

The hub device 2 is now set up to both authenticate the mobile telephone 12 and be authenticated by the mobile telephone 12, so at step s76 the SIM 20 is physically moved from the SIM reader 6 of the hub device 2 back to the SIM reader 16 of the mobile telephone 12.

Reciprocal authentication of the hub device 2 and the mobile telephone 12 may now be carried out when communication between the mobile telephone 12, containing the SIM 20, and the hub device 2, is initiated. In this example initiation of communication takes place at step s78, in which the mobile telephone 12 initiates and conducts a handshake procedure with the hub device 2. The step s78 of initiating communication may take various forms, and will depend upon the overall system arrangement between the hub device 2 and the mobile telephone 12. Although indicated for clarity as a single discrete step in FIG. 4, step s78 may therefore typically comprise a number of communications sent back and forth between the mobile telephone 12 and the hub device 2. Also, for example, step s78 may in fact effectively be initiated by the hub device 12, for example by polling to determine which local devices, in this case the mobile telephone 12, are in range and/or wish to carry out communication.

Following such initiation of communication, at step s80, the hub device 12 sends a first challenge comprising the first stored challenge number to the mobile telephone 12.

At step s82, the processor 14 of the mobile telephone 12 forwards the first challenge to the SIM 20 via the SIM reader 16.

At step s84, the SIM 20 sends a first response back to the hub device 2, the first response comprising the calculated response number for the received first challenge number.

At step s86, the mobile telephone 12 forwards the first response to the hub device 2.

At step s88, the processor 4 of the hub device 2 checks the received first response by comparing the received first response number with the first response number stored earlier at step s74. If the number matches, then hub device 2 has authenticated the presence in the mobile phone 12 of the correct SIM 20, i.e. the SIM is the same one as had been processed earlier by the hub device 2.

Following authentication by the hub device 2 of the mobile telephone 12, authentication by the mobile telephone 12 of the hub device 2 is started. At step s90, the hub device sends the second challenge-response pair comprising the second stored challenge number and corresponding second stored response number to the mobile telephone 12. Note, the first challenge-response pair cannot be used for the following procedure, since the mobile telephone 12 has already learnt of this pair in the previous steps.

At step s92, the mobile telephone 12, under control of the processor 14, stores the received second challenge number and the received second response number, i.e. the received second challenge-response pair, in the storage medium 18.

At step s94, the processor 14 of the mobile telephone 12 forwards the challenge part of the received and stored second challenge-response pair to the SIM 20 via the SIM reader 16.

At step s96, the SIM 20 sends a response back to the hub device 2, the response comprising the calculated second response number for the received second challenge number.

At step s98, the processor 14 of the mobile telephone 12 checks the response received from the SIM 20 by comparing the received second response number from the SIM 20 with the second response number previously stored earlier at step s92. If the number matches, then the mobile telephone 12 has authenticated that the hub device with which it is communicating previously had access to the correct SIM 20, i.e. the SIM now in the mobile telephone 12 had previously been processed by the hub device 2.

Hence, reciprocal authentication is complete and at step s100, both the hub device 2 and the mobile telephone 12 allow authenticated communication to take place between each other.

In this example, the encryption key has not been made use of to provide encryption. In other examples, the communication may be encrypted by using the encryption key as in the manner of the first embodiment. In yet further examples, encryption may be provided to the authenticated communication by means of an entirely separate encryption process already provided between the hub device and the mobile telephone.

After the reciprocally authenticated communication of step s100 has been terminated, when at a future time further reciprocally authentication commuriication is required, steps s78 to s100 are repeated. In those situations where more than two challenge-response pairs have been stored during the set-up phase by repetition of steps s70-s74, different challenge-response pairs may be used for each respective repetition of steps s80 to s88, and likewise different challenge-response pairs may be used for each respective repetition of steps s90 to s98.

Thus in this fourth embodiment, a process is provided in which during a set-up phase a first device (the hub device 2) is temporarily provided with the SIM 20 to store at least two challenge-response pairs, thereafter the SIM 20 is placed in a second device (in this example is returned to the second device); thereafter during a first authentication phase the first device with the stored at least two challenge-response pairs uses a stored challenge-response to interrogate a second device (the mobile telephone 12) to authenticate that the second device now has the SIM 20 that the first device was previously provided with; and thereafter during a second authentication phase the second device authenticates that the first device previously had access to the SIM 20 by verifying that a response from the at least two challenge-response pairs provided by the first device to the second device is the same as a response received by the second device from the SIM 20 when the second device interrogates the SIM 20 with the corresponding challenge of one of the challenge-response pairs received earlier by the second device from the first device.

It will be appreciated that in the above described third embodiment, the order of the various steps in the authenticating phases may be varied. For example, steps s90 to s98 may be carried out before steps s80 to s88, i.e. authentication of the hub device 2 by the mobile telephone 12 may be carried out before authentication of the mobile telephone 12 by the hub device 2 instead of after authentication of the mobile telephone 12 by the hub device 2. Other possibilities are that the two authentications may be carried out simultaneously or in some other temporally overlapping manner.

In the above embodiments, the SIM 20 is physically moved to the hub device 2 for the hub device 2 to store one or more challenge-response pairs. However, this is not essential as such, and the SIM can in other embodiments be located at a different physical location from the hub device 2 during the process steps where the SIM is indicated as "at the hub device" in the above embodiments, provided the hub device 2 has access to the SIM's functionality. This may be advantageous from a flexibility of use, or handling aspect. This can also be the case with respect to the SIM and the mobile telephone during the steps where the SIM is indicated as "at the mobile telephone" in the above embodiments, although in the above embodiments there is no particular reason for this as the SIM is one used anyway in the mobile telephone. However, in other embodiments, where the second device is not a mobile telephone, this may be advantageous.

An example of an arrangement in which any of the above embodiments can be implemented with the SIM remaining located at a different physical location from the hub device 2 will now be described with reference to FIG. 5. In the arrangement shown in FIG. 5, each element is the same as was shown in FIG. 1, and the same reference numerals are used for the same elements, except where stated otherwise in the following. In the hub device 2 in FIG. 5, the SIM reader 6 is not adapted to physically receive the SIM 20. Instead, the SIM reader 6 is connected via a lead 30 to a connector 32. Furthermore, the SIM reader 16 of the mobile telephone is connected to a further connector 34. The connector 32 of the hub device 2 and the connector of the hub device 12 are adapted to interconnect with each other. When the arrangement of FIG. 5 carries out any of the processes described in FIGS. 2 to 4, rather than the SIM 20 being physically moved to the hub device 2 to provide the hub device 2 with functional access to the SIM 20, instead the connectors 32 and 34 are connected together to provide the hub device 2 with access to the SIM 20.

Figure 5:
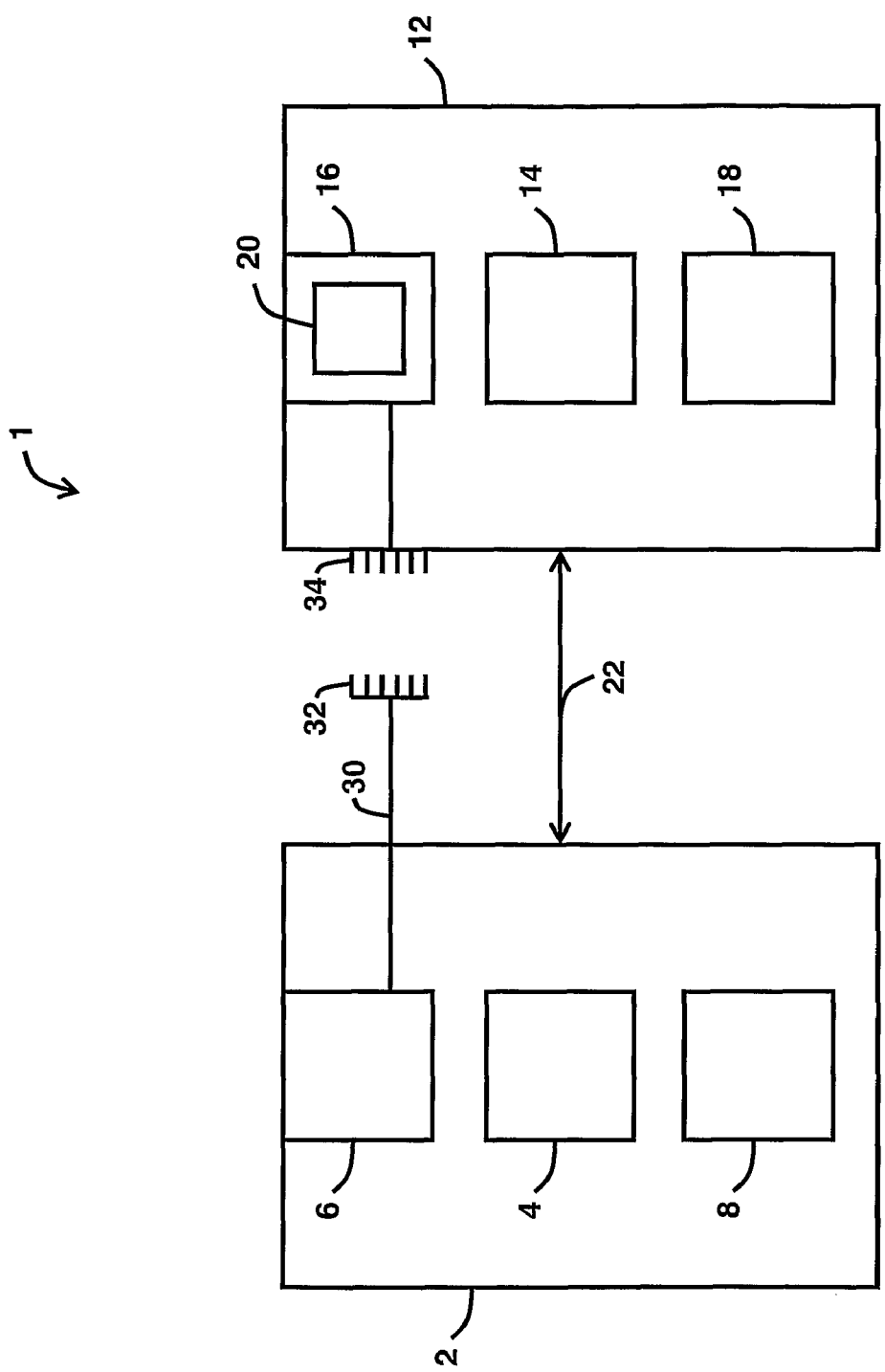
FIG. 5 is a block diagram of part of a home network in which another embodiment of the present invention is implemented.

It will be appreciated that the arrangement of FIG. 5 is merely one example of the ways in which a device can achieve functional access to the SIM without the SIM necessarily being physically moved to or located in the device. Other possibilities include other physical connection arrangements, and also non-contact arrangements, for example including further radio links, infra-red links, and so on.

Furthermore, although in the above embodiments the SIM used in the authentication procedure was one usually located in one of the devices involved in the authentication process, and therefore was already in one the devices at the start of the process, this need not be the case. For example, a SIM may be put into the hub device first for the initial hub device steps, and then installed for the first time in the local device. By way of a further example, the authentication process may be applied to two devices where neither of the devices use or need to hold a SIM for standard operation. In this case, a SIM unrelated to either device may be used for the procedure, being installed and kept in each device only at those stages the SIM is required for the authentication process. The SIM employed in the processes described above may therefore be otherwise unrelated to the devices being authenticated, i.e. the SIM may be used as an authentication tool for unrelated devices, including devices that contain no functionality of the type of device the SIM was intended for i.e. the hub device and the local device may share little or no end user functionality with a mobile telephone, yet still a SIM issued by a cellular communications network operator may be used as a tool in the authentication process carried out by the two devices in embodiments of the present invention.

In any of the above-described authentication processes, the timing as to when the SIM is inserted in or moved between the respective devices may be varied. For example, in the process shown in FIG. 2, step s10 of moving the SIM to the mobile telephone 12 (or in other embodiments, providing SIM functionality access to the local device) may take place after any of steps s12, s14, and s16. As another example, in the process shown in FIG. 3, step s40 of moving the SIM to the mobile telephone 12 (or in other embodiments, providing SIM functionality access to the local device) may take place after any of steps s42, s44, s45 and s46. As yet another example, in the process shown in FIG. 4, step s76 of moving the SIM to the mobile telephone 12 (or in other embodiments, providing SIM functionality access to the local device) may take place after any of steps s78, s80 and s82. When insertion or movement of the SIM (or provision of SIM functionality) is carried out at such later stages of the process, i.e. any time after communication has been initiated (steps s12, s42 and s78 respectively), the process tends to effectively authenticate that the user has concurrent access to the hub device 2 and the local device. Thus, when the process is implemented in this fashion, the authentication process provides authentication of single user involvement, which may be advantageous in certain circumstances or network arrangements.

In the above embodiments the challenge-response procedure employed is that specified in the GSM specification. However, in other embodiments other challenge-response procedures may be employed. For example, the challenge-response procedure specified in the UMTS specification (Universal Mobile Telecommunication System), as specified in ETSI (European Telecommunications Standards Institute) specifications TS102.221, TS131.101, TS131.102 and other related specifications, may be employed. This is similar to that of the GSM specification. A difference is that under UMTS the challenge consists of not only the random number, but also of a sequence number that should increment with each authentication. This may readily be accommodated, for example by using a given SIM only for authentication purposes as described here, or by limiting the number of authentications to within the allowed range around the current sequence number, or by using derivative functionality within SIM such as ISIM for the purpose of this authentication.

The SIM functionality used in the above embodiments may be housed and delivered in physical forms other than a conventional SIM card. For example, the functionality may be provided on a Secure Digital (SD) card or a Multi Media Card (MMC) card.

More generally, the challenge-procedure may be provided by any suitable process, provided by for example portable devices, smart cards and so on, in which unique responses for different challenges are provided, for example through message digest functions. For example, dual SIM with more than one authentication means (for example with two SIM functionalities embedded on the same physical card) can be used so that the authentication as presented here may be conducted by the SIM functionality that is entirely separated from the ordinary network authentication.

In the above described embodiments, it is typically preferable to delete a challenge-response pair once it has been used in the authentication process. In such circumstances, the earlier described optional approach of repeating the steps involved in acquiring and storing a challenge-response pair at the hub device to store plural pairs is particularly beneficially employed, as the additional stored pairs can be used when authentication is later carried out again having earlier deleted the first used pair.

In the above described embodiments, the network is a home network in which the local device is a mobile telephone, and the hub device is one which provides an interface to the home user's broadband Internet connection and forwards communications from and to the mobile telephone over that connection when the mobile telephone is in Bluetooth range of the hub device. However, the invention may be applied in other embodiments many other types of networks and with many other types of hub device and local device. For example, the hub device may be a Wi-Fi enabled set top box with the local devices including 3G/Wi-Fi telephones.

Furthermore, the bi-directional link 22 which is a Bluetooth wireless link in the above described embodiments may in general, in other embodiments, be any bi-directional communications link. For example the bi-directional communications link may be a wireless link under a protocol other than Bluetooth, or may be an infra-red link, or even a hard-wired link.

In the above embodiments the invention is implemented in a network comprising a hub device and plural local devices. However, in other embodiments the invention may be implemented between two devices in a stand-alone communications arrangement, or to plural pairs of devices in a peer-to-peer network.

In further embodiments, any functionality shown in the above-described embodiments as being provided in only one of the two devices involved in the authentication processes may instead be provided in both devices. In this case, either device may perform either directions of authentication as described above. This may be particularly advantageous in a peer-to-peer network.

The above embodiments may be implemented by providing new designs of communications device, e.g. hub device and local devices, or by configuring or adapting previous designs of device. The described functionality may be provided by hardware, firmware, software, or any combination of these. For example existing processors/storage medium may be programmed (for example with data stored at the described storage medium) to provide the above described processes. As such the described processes may be implemented by a processor implementing processor-implementable instructions stored at the storage medium. The storage medium may be any suitable storage medium, such as computer memory, ROM, PROM etc. The processor may comprise plural processors.

The invention claimed is:

1. A method for a first communications device to authenticate a second communications device, the method comprising:
   providing a first communications device with functional access to a challenge-response means which provides responses to challenges dependent upon a key held by the challenge-response means;
   at the first communications device, sending a challenge to the challenge-response means and receiving a corresponding response from the challenge-response means to establish a matched challenge-response pair;
   at the first communications device, storing the matched challenge-response pair in a memory;
   removing functional access to the challenge-response means from the first communications device;
   after said removal, providing a second communications device with functional access to the challenge-response means;
   at the first communications device, sending the challenge of the stored challenge-response pair to the second communications device;
   at the second communications device, sending the challenge of the stored challenge-response pair received from the first communications device to the challenge-response means and receiving at the second communications device a corresponding response from the challenge-response means;
   at the second communications device, sending the received response from the challenge-response means to the first communications device; and
   authenticating the second communications device at the first communications device by verifying that the response received from the second communications device is the same as the stored response.

2. The method according to claim 1, wherein the second communications device authenticates the first communications device, the method further comprising:
- at the first communications device when it has functional access to the challenge-response means, sending at least one further challenge to the challenge-response means and receiving a corresponding at least one further response from the challenge-response means to establish in total at least two matched challenge-response pairs;
- at the first communications device, storing the at least one further challenge-response pair in a memory thereby providing in total at least two stored matched challenge-response pairs; and
- at the first communications device, sending one of the at least two stored challenge-response pairs to the second communications device;
- at the second communications device, receiving the challenge-response pair sent from the first communications device and storing the received challenge-response pair in a memory;
- at the second communications device when it has functional access to the challenge-response means, sending the challenge of the received challenge-response pair to the challenge-response means and receiving a corresponding further response from the challenge-response means; and
- authenticating the first communications device at the second communications device by verifying that the further response received from the challenge-response means is the same as the stored response of the stored challenge-response pair.

3. A method for a second communications device to authenticate a first communications device; the method comprising:
- providing a first communications device with functional access to a challenge-response means which provides responses to challenges dependent upon a key held by the challenge-response means;
- at the first communications device, sending a challenge to the challenge-response means and receiving a corresponding response from the challenge-response means to establish a matched challenge-response pair;
- at the first communications device, storing the matched challenge-response pair in a memory;
- removing functional access to the challenge-response means from the first communications device;
- after said removal, providing a second communications device with functional access to the challenge-response means;
- at the first communications device, sending the stored challenge-response pair to the second communications device;
- at the second communications device, receiving the challenge-response pair and storing the received challenge-response pair in a memory;
- at the second communications device, sending the stored challenge to the challenge-response means received from the first communications device and receiving at the second communications device a corresponding response from the challenge-response means; and
- authenticating the first communications device at the second communications device by verifying that the response received from the challenge-response means is the same as the stored response.

4. The method according to claim 1, wherein the first communications device is a hub device and the second communications device is a local device of a local network.

5. The method according to claim 1, wherein the challenge-response means is a Subscriber Identity Module of a cellular communications network.

6. The method according to claim 1, wherein providing the second communications device with functional access to the challenge-response means comprises physically locating the challenge-response means in or in contact with the second communications device.

7. The method according to claim 1, wherein providing the first communications device with functional access to the challenge-response means comprises physically locating the challenge-response means in or in contact with the first communications device.

8. The method according to claim 6, wherein providing the first communications device with functional access to the challenge-response means comprises the first communications device coupling to the challenge-response means while the challenge-response means is physically located in, or in contact with the second communications device.

9. A first communications device adapted to authenticate a second communications device, the first and second communications devices each having functional access to a challenge-response means;
- the first communications device including memory and at least one processor and being configured to provide a challenge to the challenge-response means when the first communications device has functional access to the challenge-response means, the challenge-response means providing responses to challenges dependent upon a key held by the challenge-response means;
- the first communications device being further configured to store the challenge and store a response corresponding to the challenge received from the challenge-response means in said memory;
- the first communications device being further configured to send the stored challenge to the second communications device;
- the first communications device being further configured to receive a response from the second communications device; and
- the first communications device further configured to authenticate the second communications device by verifying that the response received from the second communications device is the same as the stored response;
- wherein the challenge-response means to which the first communications device has functional access is the same challenge-response means to which the second communications device has functional access, the first communications device having functional access to the challenge-response means at a time when the second communications device does not have access to the challenge-response means.

10. The first communications device according to claim 9, further configured to be authenticated by the second communications device;
- the first communications device being further configured to provide a further challenge to the challenge-response means when the first communications device has functional access to the challenge-response means;
- the first communications device being further configured to store the further challenge in said memory and to store a further response in said memory, corresponding to the further challenge, received from the challenge-response means; and
- the first communications device being further configured to send the stored further challenge and the stored further response to the second communications device.

11. A second communications device having memory and at least one processor and adapted to authenticate a first communications device, the first and second communications devices each having functional access to a challenge-response means;

the second communications device being configured to receive and store in its memory a challenge-response pair from the first communications device;

the second communications device being configured to send the challenge of the received and stored challenge-response pair to a challenge-response means when the second communications device has functional access to the challenge-response means, the challenge-response means providing responses to challenges dependent upon a key held by the challenge-response means;

the second communications device being configured to receive a response from the challenge-response means; and the second communications device being configured to authenticate the first communications device by verifying that the response received from the challenge-response means is the same as the response stored at the second communications device;

wherein the challenge-response means to which the second communications device has functional access is the same challenge-response means to which the first communications device has functional access, the second communications device having functional access to the challenge-response means at a time when the first communications device does not have access to the challenge-response means.

12. The communications device according to claim 9, wherein the challenge-response means is a Subscriber Identity Module of a cellular communications network.

13. The communications device according to claim 9, comprising means for physically locating the challenge-response means in or in contact with the communications device for providing functional access to the challenge-response means.

14. The communications device according to claim 9, further comprising means for achieving functional access to the challenge-response means comprising means for coupling to the challenge-response means while the challenge-response means is physically located in or in contact with a different communications device.

15. A non-transitory storage medium storing processor-implementable instructions for controlling one or more processors to carry out the method of claim 1.

16. A communications system comprising a first communications device according to claim 9 and a second communications device adapted to authenticate a first communications device, the first and second communications devices each having functional access to a challenge-response means;

the second communications device having memory and at least one processor and being configured to receive and store in its memory a challenge-response pair from the first communications device;

the second communications device being configured to send the challenge of the received and stored challenge-response pair to a challenge-response means when the second communications device has functional access to the challenge-response means, the challenge-response means providing responses to challenges dependent upon a key held by the challenge-response means;

the second communications device being configured to receive a response from the challenge-response means; and the second communications device being configured to verify that the response received from the challenge-response means is the same as the stored response;

wherein the challenge-response means to which the second communications device has functional access is the same challenge-response means to which the first communications device has functional access, the second communications device having functional access to the challenge-response means at a time when the first communications device does not have access to the challenge-response means.

17. A communications system comprising a first communications device and a second communications device adapted to authenticate a first communications device, the first and second communications devices each having memory and at least one processor and functional access to a challenge-response means;

the first communications device being configured to provide a challenge to the challenge-response means when the first communications device has functional access to the challenge-response means, the challenge-response means providing responses to challenges dependent upon a key held by the challenge-response means;

the first communications device being further configured to store the challenge in its memory and store a response in its memory corresponding to the challenge received from the challenge-response means; and the first communications device being further configured to send the stored challenge and the stored response to the second communications device;

the second communications device being configured to receive and store in its memory a challenge-response pair from the first communications device;

the second communications device being configured to send the challenge of the received and stored challenge-response pair to a challenge-response means when the second communications device has functional access to the challenge-response means, the challenge-response means providing responses to challenges dependent upon a key held by the challenge-response means;

the second communications device being configured to receive a response from the challenge-response means; and the second communications device being configured to verify that the response received from the challenge-response means is the same as the stored response;

wherein the challenge-response means to which the second communications device has functional access is the same challenge-response means to which the first communications device has functional access, the second communications device having functional access to the challenge-response means at a time when the first communications device does not have access to the challenge-response means and vice versa.

18. The communications system of claim 16, the challenge-response means to which the second communications device is configured to send the challenge of the received and stored challenge-response pair to also being the challenge-response means to which the first communications device is configured to provide a further challenge.

19. The communications system of claim 17, the challenge-response means to which the second communications device is configured to send the challenge of the received and stored challenge-response pair to also being the challenge-response means to which the first communications device is configured adapted to provide a further challenge.

* * * * *